US010430683B2

(12) United States Patent
Liu et al.

(10) Patent No.: US 10,430,683 B2
(45) Date of Patent: Oct. 1, 2019

(54) IMAGE PROCESSING METHOD AND PROCESSING DEVICE

(71) Applicant: BOE Technology Group Co., Ltd., Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/936,755

(22) Filed: Mar. 27, 2018

(65) Prior Publication Data
US 2019/0138838 A1 May 9, 2019

(30) Foreign Application Priority Data
Nov. 9, 2017 (CN) .......................... 2017 1 1100015

(51) Int. Cl.
| H04N 7/01 | (2006.01) |
| G06N 3/02 | (2006.01) |
| G06K 9/40 | (2006.01) |
| G06T 5/00 | (2006.01) |
| H04L 29/06 | (2006.01) |

(52) U.S. Cl.
CPC ............... *G06K 9/40* (2013.01); *G06N 3/02* (2013.01); *G06T 5/002* (2013.01); *H04N 7/0117* (2013.01); *H04L 63/0428* (2013.01)

(58) Field of Classification Search
CPC . G06K 9/40; G06N 3/02; G06T 5/002; G06T 3/40; H04N 7/0117; H04L 63/0428; H04L 2209/34
See application file for complete search history.

(56) References Cited

U.S. PATENT DOCUMENTS

| 9,123,138 | B2* | 9/2015 | Lin | ....................... G06T 3/4076 |
| 2018/0240257 | A1* | 8/2018 | Li | ........................... G06T 11/60 |
| 2018/0295320 | A1* | 10/2018 | Breternitz | ............ H04N 7/0117 |
| 2019/0080498 | A1* | 3/2019 | Horie | ...................... G06T 11/60 |
| 2019/0114742 | A1* | 4/2019 | Wang | .................... G06T 3/4046 |

FOREIGN PATENT DOCUMENTS

| CN | 107122826 A | 9/2017 |
| CN | 107180410 A | 9/2017 |

OTHER PUBLICATIONS

Li, Shaohua et al., "Laplacian-Steered Neural Style Transfer", Session: Fast Forward 6, MM'17, Oct. 23-27, 2017, Mountain View, CA, USA, 9 pages.

First Office Action, including Search Report, for Chinese Patent Application No. 201711100015.5, dated Jul. 2, 2019, 25 pages.

* cited by examiner

*Primary Examiner* — Hung H Lam
(74) *Attorney, Agent, or Firm* — Westman, Champlin & Koehler, P.A.

(57) ABSTRACT

There are provided an image processing method and an image processing device. The image processing method comprises: acquiring an input image; acquiring a first noise image and a second noise image; executing image conversion processing on the input image with the first noise image using a generative neural network, to acquire a first output image; and executing high resolution conversion processing on the first output image with the second noise image using a super-resolution neural network, to acquire a second output image, wherein the first noise image is different from the second noise image.

20 Claims, 10 Drawing Sheets

IMAGE PROCESSING METHOD AND PROCESSING DEVICE

CROSS-REFERENCE TO RELATED APPLICATION(S)

This application claims the benefit of Chinese Patent Application No. 201711100015.5, filed on Nov. 9, 2017, the entire contents of which are incorporated herein by reference.

TECHNICAL FIELD

The present disclosure relates to image processing, and more particularly, to an image processing method and a processing device.

BACKGROUND

There is a technology of using deep neural networks for image processing and conversion, which has emerged as the deep learning technology evolves. However, an image processing and a conversion system in a related art has a complicated structure, is difficult to train, and has an output image which lacks diversity.

SUMMARY

The present disclosure provides an image processing method, a processing apparatus and a processing device.

An aspect of the embodiments of the present disclosure provides an image processing method, comprising: acquiring an input image; acquiring a first noise image and a second noise image; executing image conversion processing on the input image with the first noise image using a generative neural network, to output the input image converted as a first output image; and executing high resolution conversion processing on the first output image with the second noise image using a super-resolution neural network, to output the first output image converted as a second output image, wherein the first noise image is different from the second noise image.

According to the embodiments of the present disclosure, the input image comprises a first color component, a second color component and a third color component; the first noise image comprises N components, where N is an integer greater than or equal to 1; an input to the generative neural network comprises the N components of the first noise image and the first color component, the second color component and the third color component of the input image; and an output from the generative neural network is the first output image which comprises the first color component, the second color component, and the third color component.

According to the embodiments of the present disclosure, the generative neural network is configured to comprise one or more down-scale units, one or more residual units and one or more up-scale units, wherein the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein a number of the up-scale units is equal to a number of the down-scale units.

According to the embodiments of the present disclosure, the second noise image comprises M components, where M is an integer greater than or equal to 1, and the super-resolution neural network is configured to have the M components of the second noise image and a first color component, a second color component and a third color component of the first output image as an input; and an output from the super-resolution neural network is the second output image which comprises the first color component, the second color component and the third color component.

According to the embodiments of the present disclosure, the super-resolution neural network comprises an enhancement unit and a transform unit which are sequentially connected, and executing high resolution conversion processing using the super-resolution neural network comprises: executing up-scale processing on the first output image and the second noise image using the enhancement unit and outputting a first intermediate image which comprises a luminance component, a first color difference component, and a second color difference component; and transforming the first intermediate image output from the enhancement unit into the second output image which comprises a first color component, a second color component and a third color component using the transform unit.

According to the embodiments of the present disclosure, the enhancement unit comprises a first sub-network, a second sub-network and a third sub-network, wherein an input to each of the sub-networks is the first output image and the second noise image; and all of the sub-networks have the same structure, and comprise the same number of convolutional layers and the same number of enhancement layers.

According to the embodiments of the present disclosure, the input image is a first training image, the first noise image is a first training noise image, and the first output image is a first training output image, and the image processing method further comprises: acquiring a second training noise image; and generating a second training output image according to the first training image and the second training noise image using the generative neural network; and training the generative neural network based on the first training image, the first training output image and the second training output image.

According to the embodiments of the present disclosure, training the generative neural network comprises: inputting the first training output image to a discriminative neural network to acquire a discrimination label indicating whether the first training output image has converted features; and calculating a loss value of the generative neural network and optimizing parameters of the generative neural network according to the first training image, the first training output image, the second training output image and the discrimination label. Calculating a loss value of the generative neural network comprises: acquiring content features of the first training image, the first training output image and the second training output image, and acquiring style features of the first training output image and the second training output image; calculating, in accordance with a first loss function, the loss value of the generative neural network according to the acquired content features and style features and the discrimination label of the first training output image; and optimizing the parameters of the generative neural network according to the loss value of the generative neural network.

According to the embodiments of the present disclosure, the first loss function comprises a style difference loss function, and calculating the loss value of the generative neural network comprises: calculating, in accordance with the style difference loss function, a style loss value of the generative neural network according to the style features of the first training output image and the style features of the second training output image. The first loss function further comprises a content loss function, and calculating the loss value of the generative neural network comprises: calculating, in accordance with the content loss function, a content loss value of the generative neural network according to the content features of the first training image, the first training output image and the second training output image.

According to the embodiments of the present disclosure, the first output image is a first sample image, and the image processing method further comprises: acquiring a super-resolution training noise image; extracting a low-resolution image from the first sample image as a super-resolution training image, wherein a resolution of the super-resolution training image is lower than that of the first sample image; outputting a second sample image according to the super-resolution training image and the super-resolution training noise image using the super-resolution neural network, wherein a resolution of the second sample image is equal to that of the first sample image; and optimizing parameters of the super-resolution neural network by reducing a cost function of the super-resolution neural network according to the first sample image and the second sample image.

Another aspect of the embodiments of the present disclosure further provides an image processing device, comprising: one or more processor; and one or more memory, wherein the memory has computer readable instructions stored thereon, which when being executed by the one or more processor, cause the processor to be configured to: configure a generative neural network to execute image conversion processing on an input image with a first noise image, to acquire a first output image; and configure a super-resolution neural network to execute high resolution conversion processing on the first output image with a second noise image, to acquire a second output image, wherein the first noise image is different from the second noise image.

According to the embodiments of the present disclosure, the input image comprises a first color component, a second color component and a third color component, and the first noise image comprises N components, where N is an integer greater than or equal to 1; an input to the generative neural network comprises the N components of the first noise image and the first color component, the second color component and the third color component of the input image; and the generative neural network is configured to output the first output image which comprises the first color component, the second color component, and the third color component.

According to the embodiments of the present disclosure, the generative neural network is configured to comprise one or more down-scale units, one or more residual units and one or more up-scale units, wherein the down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein a number of the up-scale units is equal to a number of the down-scale units.

According to the embodiments of the present disclosure, the second noise image comprises M components, where M is an integer greater than or equal to 1, and an input to the super-resolution neural network comprises the M components of the second noise image and a first color component, a second color component and a third color component of the first output image; and an output from the super-resolution neural network is the second output image which comprises the first color component, the second color component and the third color component.

According to the embodiments of the present disclosure, wherein the super-resolution neural network is configured to comprise an enhancement unit and a transform unit which are sequentially connected, wherein the enhancement unit is configured to execute up-scale processing on the first output image and the second noise image and outputting a first intermediate image which comprises a luminance component, a first color difference component, and a second color difference component; and the transform unit is configured to transform the first intermediate image output from the enhancement unit into the second output image which comprises a first color component, a second color component and a third color component, wherein the enhancement unit comprises a first sub-network, a second sub-network and a third sub-network.

According to the embodiments of the present disclosure, an input to each of the first sub-network, the second sub-network and the third sub-network is the first output image and the second noise image, and the output image has three components which comprise a luminance component, a first color difference component and a second color difference component; and all of the first sub-network, the second sub-network and the third sub-network have the same structure, and each comprise at least one enhancement sub-unit each of which comprises one or more convolutional layers and one enhancement layer which are sequentially connected.

According to the embodiments of the present disclosure, the input image is a first training image, the first noise image is a first training noise image, and the first output image is a first training output image, the generative neural network further generates a second training output image according to the first training image and an acquired second training noise image, wherein the second training noise image is different from the first training noise image; and the processors is configured to train the generative neural network based on the first training image, the first training output image and the second training output image.

The processor is further configured to output a discrimination label indicating whether the first training output image has converted features; and calculate a loss value of the generative neural network and optimize parameters of the generative neural network according to the first training image, the first training output image, the second training output image and the discrimination label.

The processor is further configured to calculate a loss value of the generative neural network and optimize parameters of the generative neural network by executing the processes of acquiring content features of the first training image, the first training output image and the second training output image, acquiring style features of the first training output image and the second training output image; calculating, in accordance with a first loss function, the loss value of the generative neural network according to the acquired content features and style features and the discrimination label of the first training output image; and optimizing the parameters of the generative neural network according to the loss value of the generative neural network.

According to the embodiments of the present disclosure, the first loss function comprises a style difference loss function for calculating a style loss value of the generative neural network according to the style features of the first training output image and the style features of the second training output image; and the first loss function further comprises a content loss function for calculating a content loss value of the generative neural network according to the content features of the first training image, the first training output image and the second training output image.

According to the embodiments of the present disclosure, the processor is further configured to train the super-resolution neural network according to the output from the super-resolution neural network, wherein the first output image is a first sample image, and the super-resolution neural network further outputs a second sample image according to a super-resolution training image and an acquired super-resolution training noise image, wherein the super-resolution training image is a low-resolution image extracted from the first sample image, and wherein the processor is further configured to: output a discrimination label based on the first sample image and the second sample image; and optimize parameters of the super-resolution neural network by reducing a cost function of the super-resolution neural network.

BRIEF DESCRIPTION OF THE DRAWINGS

In order to describe the embodiments of the present disclosure or the technical solutions in the related art more clearly, accompanying drawings required for describing the embodiments or the technology in the related art will be briefly introduced below. Obviously, the accompanying drawings in the following description are merely some embodiments of the present disclosure, and those of ordinary skill in the art can further obtain other accompanying drawings from these accompanying drawings without creative efforts.

DETAILED DESCRIPTION

The technical solutions in the embodiments of the present disclosure are clearly and completely described below with reference to the accompanying drawings in the embodiments of the present disclosure. Obviously, the described embodiments are merely a part of the embodiments of the present disclosure, rather than all the embodiments. All other embodiments obtained by those of ordinary skill in the art based on the embodiments of the present disclosure without creative efforts shall fall within the protection scope of the present disclosure.

The embodiments of the present disclosure provide an image processing method, an image processing apparatus, and an image processing device, for implementing image conversion. The image processing method, the image processing apparatus, and the image processing device execute image conversion based on a generative neural network, a super-resolution neural network, and content perception. Detail information of a converted image is generated by adding a noise image in an input. The generative neural network is trained by using a content feature loss function, to ensure that the converted output image has the same content as that of the input image. The generative neural network is trained by using a style difference loss function between processed results, to ensure diversity of output results, which makes the system simple and easy to train. Based thereon, the super-resolution neural network is used to enhance a resolution of the converted image from the generative neural network, so as to obtain a high-resolution converted image, which meets the requirements of the product for the image resolution.

Figure 1:
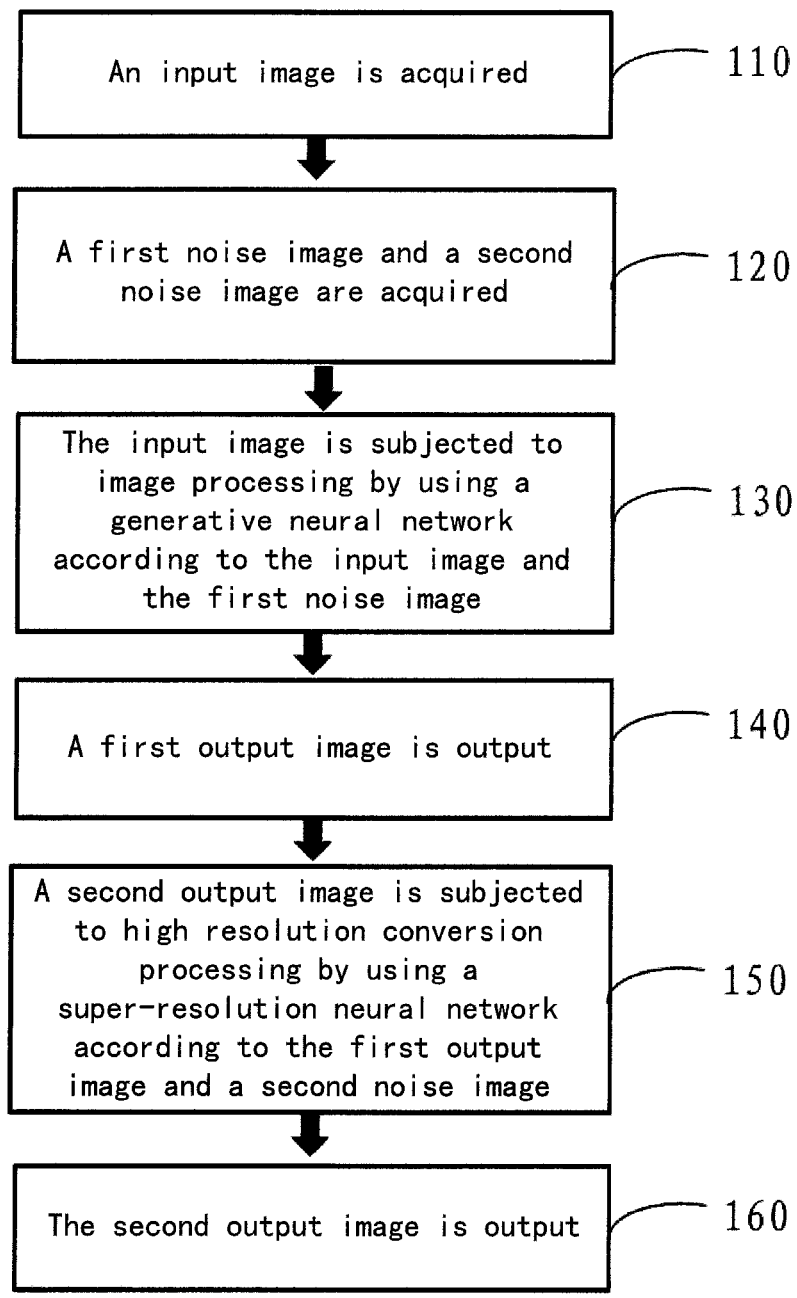
FIG. 1 illustrates a flowchart of an image processing method according to an embodiment of the present disclosure.

A flowchart of the image processing method according to the embodiments of the present disclosure is shown in FIG. 1. In step S110, an input image to be subjected to image conversion processing is acquired. The input image, as original information, comprises three components, which are a first color component, a second color component and a third color component, i.e., RGB components in the embodiments of the present disclosure. Next, in step S120, a first noise image and a second noise image are acquired, wherein the first noise image comprises N components, where N is an integer greater than or equal to 1, and the first noise image is different from the second noise image. In the embodiments of the present disclosure, for example, N may be 1, that is, the first noise image may be input as a fourth component into the generative neural network together with the RGB component information of the input image. The noise may be a random noise such as a Gaussian noise. In other embodiments of the present disclosure, for example, N may be 3.

In step S130, the input image acquired in step S110 is input into the generative neural network together with the first noise image acquired in step S120 for image conversion processing. For example, in the case of N=3, the first noise image may comprise three components. The generative neural network may add the three components of the first noise image to the RGB components of the original image which is desired to be subjected to image conversion processing, respectively so as to obtain the converted input image. As each input noise image contains a random noise, conversion results with different detail information may be obtained by executing multiple image conversion processing even using the same generative neural network for the same input image, which brings about diversity of the converted results. In addition, a sequence of acquiring the input image and acquiring the noise images does not affect the image conversion processing result.

In step S140, the generative neural network outputs the input image converted as a first output image. The first output image has three components, i.e., RGB components in the embodiments of the present disclosure. The generative neural network may be subjected to different training processes to achieve different image processing, such as image style, scene, season, effect or other features based image conversion.

In step S150, the first output image from the generative neural network is input into the super-resolution neural network together with the second noise image to complete high-resolution conversion processing, so as to enhance a resolution of the first output image. The second noise image may comprise M components, where M is an integer greater than or equal to 1. In the embodiments of the present disclosure, M may be, for example, 1, that is, the second noise image is input into the super-resolution neural network as a separate component for generating image detail information during super-resolution conversion. In other embodiments of the present disclosure, M may also be, for example, 3. The second output image containing noise information may be generated by adding the three components of the second noise image to the RGB components of the first output image respectively. The super-resolution neural network executes image processing on the first output image with the second noise image so as to add the noise information from the second noise image to the first output image and enhance the resolution of the first output image.

In step S160, the super-resolution neural network outputs a second output image whose resolution is enhanced. As the super-resolution neural network uses information of the second noise image in the process of enhancing the resolution, the results with different detail information may be obtained by executing multiple image processing operations even using the same super-resolution neural network for the same input image, which further brings about diversity of the converted results.

Figure 2:
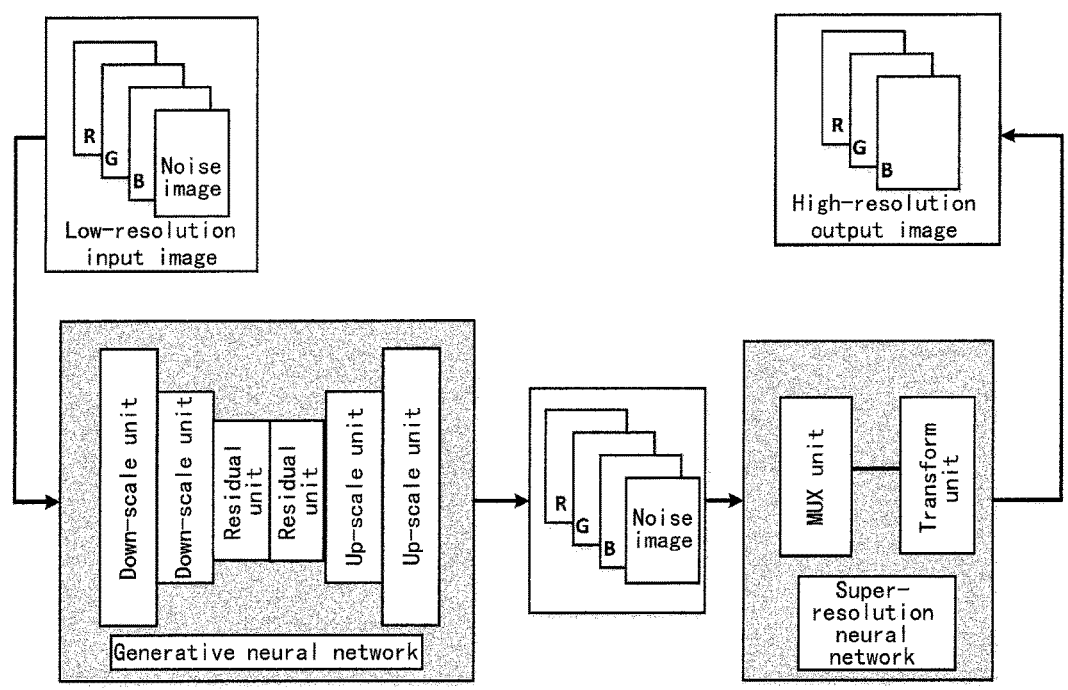
FIG. 2 illustrates a structural diagram of a neural network for implementing the image processing method in FIG. 1.
Figure 3:
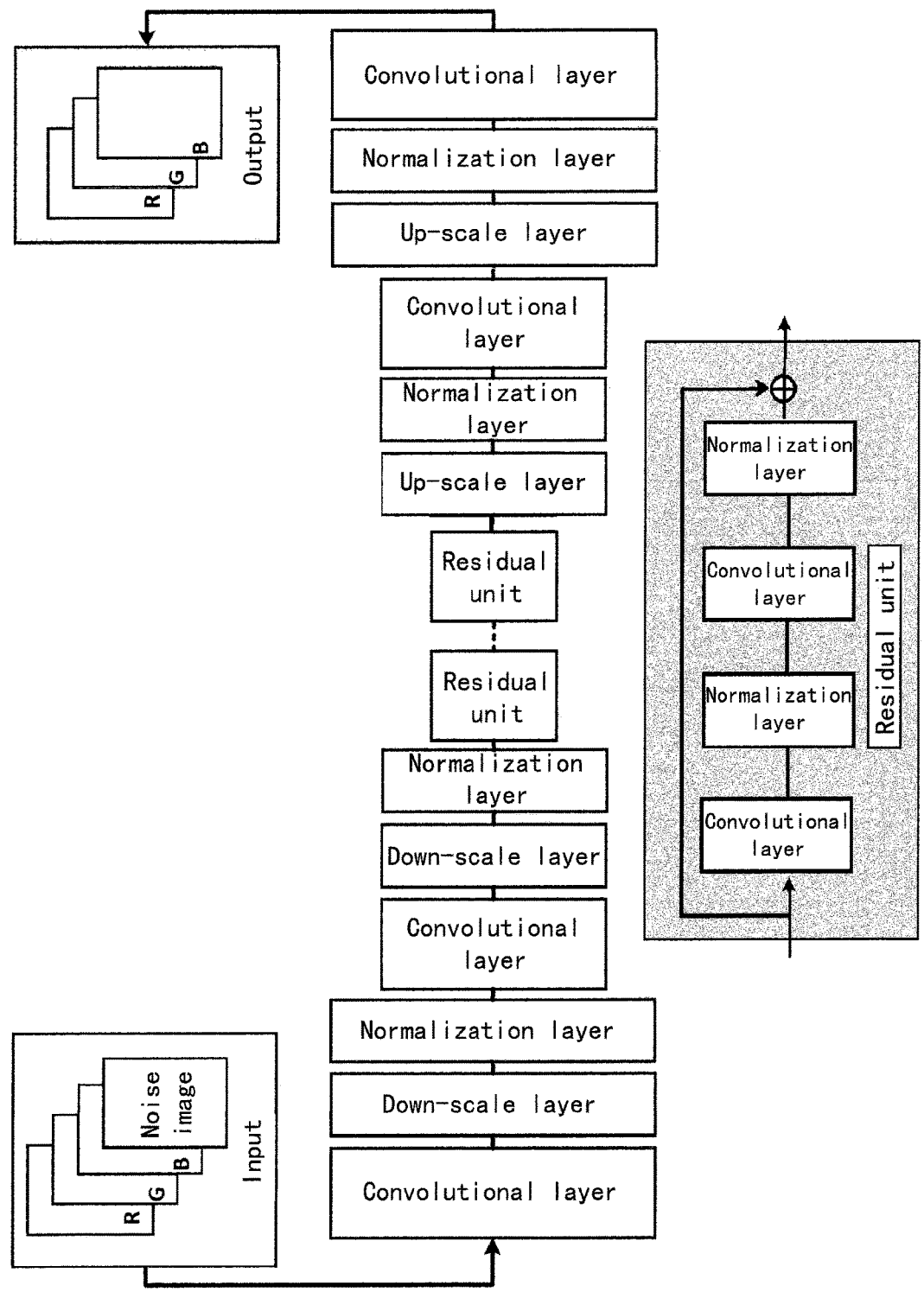
FIG. 3 illustrates a specific structural diagram of a generative neural network in FIG. 2.

FIG. 2 illustrates a structural diagram of a neural network for implementing the above image processing method, which comprises a generative neural network and a super-resolution neural network. FIG. 3 illustrates a specific structural diagram of the generative neural network in FIG. 2. The generative neural network will be described in detail below with reference to FIG. 2 and FIG. 3.

As shown in FIG. 2, an input to the generative neural network comprises three components (features) of an input image, specifically including a first color component, a second color component and a third color component, i.e., RGB components in the embodiments of the present disclosure. The input to the generative neural network further comprises the first noise image. An output from the generative neural network is a first output image having three components, i.e., RGB components in the embodiments of the present disclosure. The generative neural network is configured to comprise one or more down-scale units, one or more residual units and one or more up-scale units. A depth of the generative neural network is determined by a number of the down-scale units, the residual units and the up-scale units, which is determined according to a specific conversion application. In addition, a number of the down-scale units should be the same as that of the up-scale units, to ensure that the output image has the same image size as that of the input image.

The down-scale units each are configured to execute convolution processing on the input image and the noise image to extract image features and reduce a size of a mini-batch. The residual units each further execute convolution processing on the mini-batch output by the down-scale units without changing the size of the mini-batch. The up-scale units each are configured to amplify and normalize the mini-batch output by the residual units, to output an output image which is obtained after the feature conversion. Converted features of the output image are determined by parameters of the generative neural network. According to the conversion application, the generative neural network is trained by using a training image to optimize the parameters for conversion purposes. The image conversion application may be a conversion of an image style, a season, an effect, a scene, etc., for example, converting a landscape image into an image with Van Gogh's artwork features, converting an image with summer features into an image with winter features, converting an image with a brown horse into an image with zebra's features, or even converting a cat into a dog.

As shown in FIG. 3, the down-scale units each comprise a convolutional layer, a down-scale layer and an instance normalization layer which are sequentially connected.

In the convolutional layer, a neuron is only connected to neurons in a part of adjacent layers. The convolutional layer may apply a number of convolution kernels to the input image to extract various types of features. Each convolution kernel may extract one type of features. During training of the generative neural network, reasonable weights are reached for the convolution kernels through learning. A result obtained by applying a convolution kernel to the input image is referred to as a mini-batch, and a number of mini-batches is the same as that of the convolution kernels. Each mini-batch is composed of a number of neurons which are arranged in a rectangle, and neurons of the same mini-batch share a weight, that is, a convolution kernel. Mini-batches output by one convolutional layer may be processed by a next convolutional layer to obtain new mini-batches. For example, the input image may be processed by one convolutional layer to obtain content features thereof, which may be processed by a next convolutional layer to obtain style features.

The down-scale layer (which may be, for example, a pooling layer) may down-sample the images, which may reduce a size of the mini-batches without changing a number of the mini-batches, and execute feature compression on the images, to extract main features. In addition, the down-scale layers each may reduce a scale of the mini-batches to simplify the computational complexity and reduce the overfitting phenomenon to a certain extent.

The instance normalization layer is configured to normalize mini-batches output by a previous layer. In the embodiments of the present disclosure, normalization is executed according to a mean and a variance of each mini-batch. Assuming that a number of selected mini-batches is T and a number of features output by a certain convolutional layer is C, and each mini-batch is a matrix of H rows and W columns, the mini-batches are represented as (T,C,W,H), and a normalization formula is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm}, \text{ and}$$

-continued $$\sigma_{ti}^2 = \frac{1}{HW} \sum_{l=1}^{W} \sum_{m=1}^{H} (x_{tilm} - m\mu_{ti})^2$$

where $x_{tijk}$ is a value in a $j^{th}$ column and a $k^{th}$ row of an $i^{th}$ mini-batch of a $t^{th}$ patch in a set of mini-batches output by a certain convolutional layer. $y_{tijk}$ represents a result obtained from processing by an instance normalization layer, and ε is a small integer value, to avoid a denominator from being 0.

As shown in FIG. 3, the residual units each comprise a convolutional layer and an instance normalization layer, as well as a skip connection, so that the residual unit have two parts, one of which is a processing part having the convolutional layer and the instance normalization layer and the other of which is a skip part which does not process an input image, and the skip connection directly adds an input to the residual unit to an output from the processing part. The Introduction of the skip connection in the residual unit can provide greater flexibility to the generative neural network. After the training of the generative neural network is completed, a degree of influence of the processing part and the skip part of the residual unit on the image processing result may be judged during system deployment. According to the degree of influence, a structure of the generative neural network may be tailored to improve an operation efficiency and a processing speed of the network. For example, if it is judged that the influence of the skip connection part on the image processing result is much greater than that of the processing part, only the skip part in the residual unit may be used in the image processing by using the generative neural network to improve the processing efficiency of the network.

As shown in FIG. 3, the up-scale units each comprise an up-scale layer, an instance normalization layer and a convolutional layer which are sequentially connected to extract features of input images and normalize mini-batches.

Figure 4:
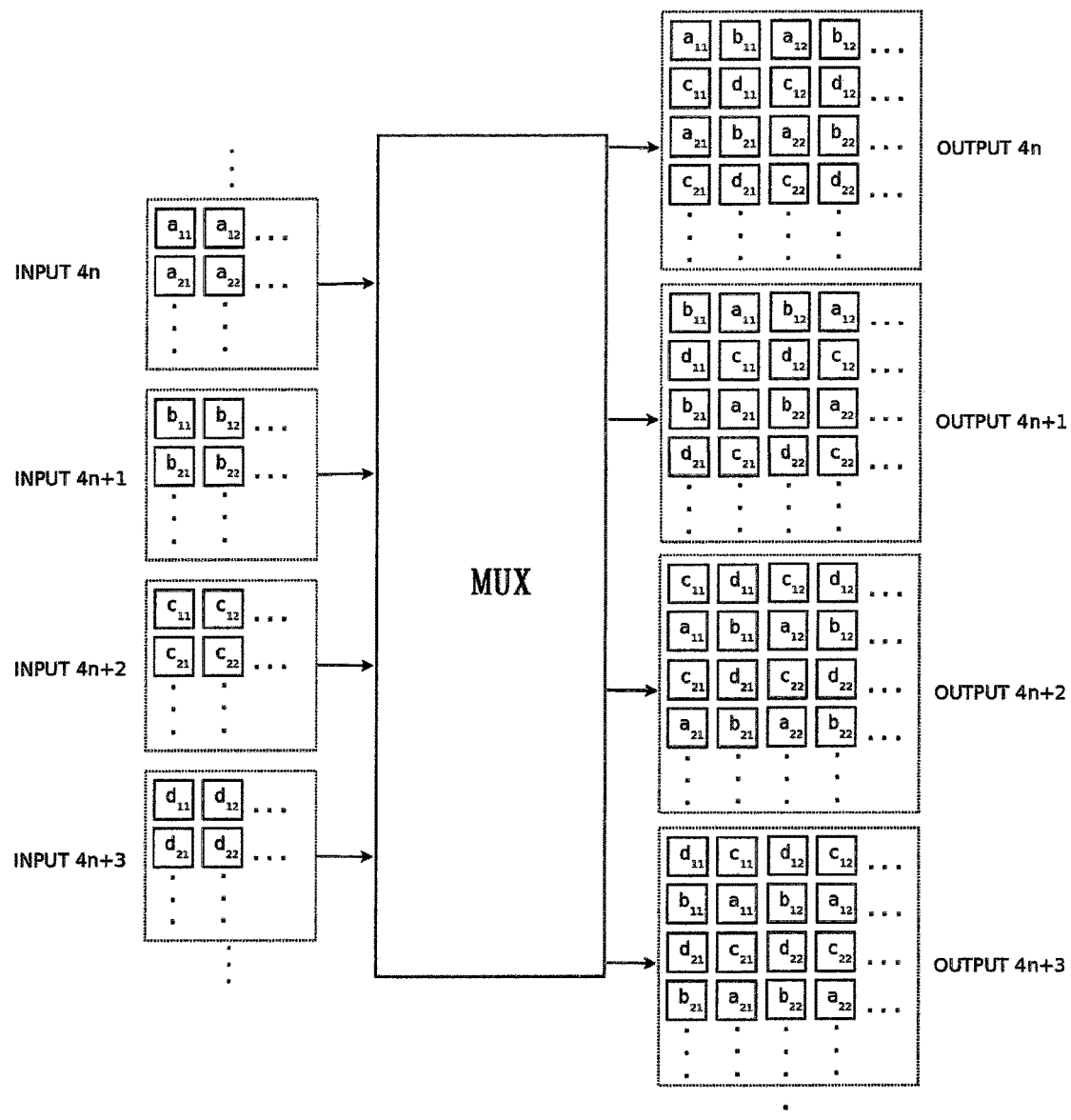
FIG. 4 illustrates a diagram of an enhancement layer.

The up-scale layer may be, for example, an enhancement layer (a MUX layer) which may execute pixel interleaving and rearrangement processing on a plurality of input images so as to increase a size of each of images without changing a number of the images. As a result, the MUX layer increases a number of pixels per image by arranging and combining pixels in different images. FIG. 4 illustrates a diagram of up-scale using a 2*2 MUX layer. For four input images INPUT 4n, INPUT 4n+1, INPUT 4n+2, and INPUT 4n+3, assuming that a number of pixels of the input images is a*b, four images OUTPUT 4n, OUTPUT 4n+1, OUTPUT 4n+2 and OUTPUT 4n+3 with 2a*2b pixels are output after pixel rearrangement processing of the 2*2 MUX layer, which increases pixel information per image.

In the embodiments of the present disclosure, the first noise image component is input into the generative neural network together with N components (which are RGB components in the embodiments of the present disclosure) of the input image, and the input image and the noise image are processed by the down-scale units, the residual units and the up-scale units described above, so that mini-batches thereof are extracted, and finally an output image having converted features is output. The noise image has a random noise for generating detail information in the output image, and as noise images which are input multiple times are different, even if the same input image is input in succession into the same generative neural network two times, converted images having different details may also be obtained, which enriches the detail information of the converted images, and can provide better user experience.

Figure 5:
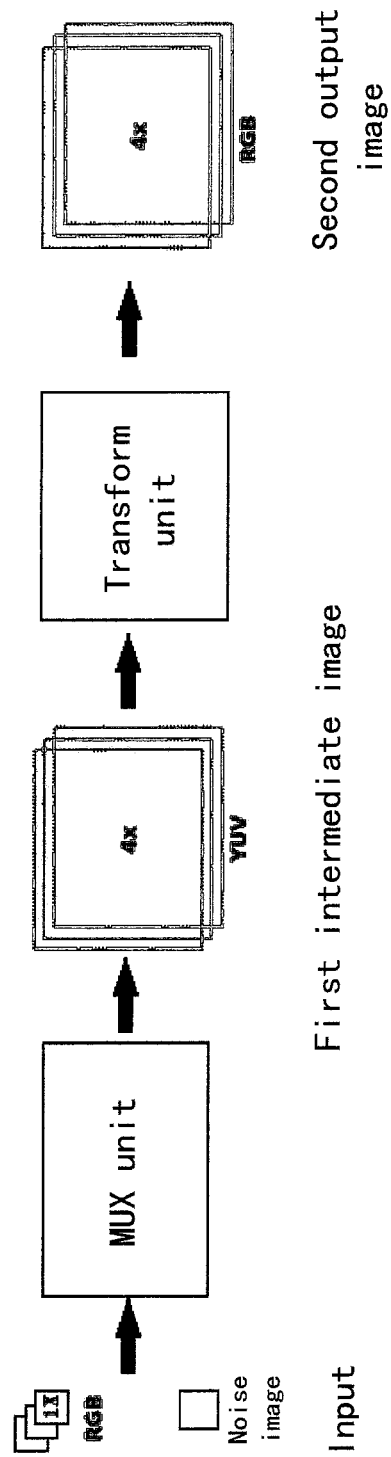
FIG. 5 illustrates a structural diagram of a super-resolution neural network in FIG. 2.
Figure 6:
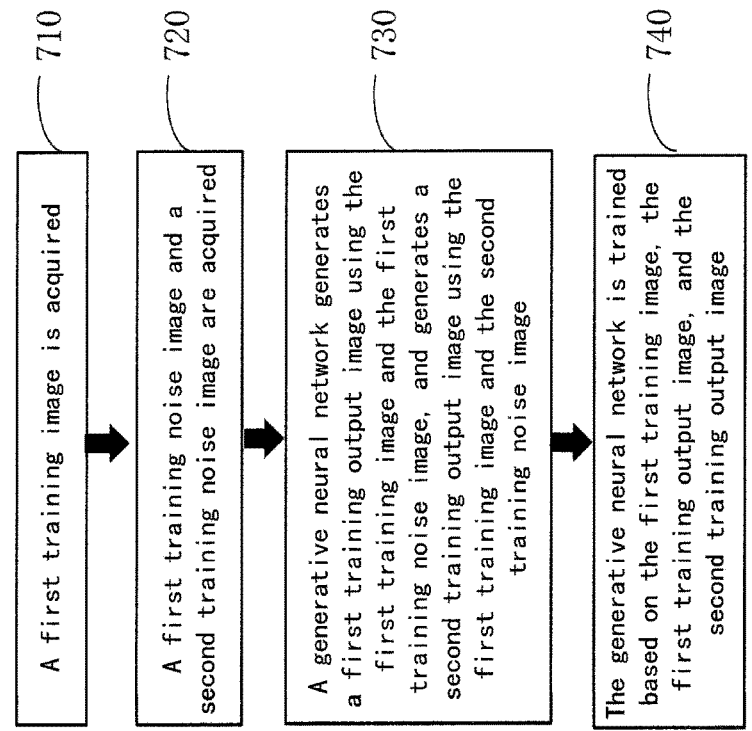
FIG. 6 illustrates a specific structural diagram of the super-resolution neural network in FIG. 5.

FIG. 5 illustrates a structural diagram of the super-resolution neural network shown in FIG. 2, and FIG. 6 illustrates a specific structure diagram of the super-resolution neural network shown in FIG. 2. The super-resolution neural network will be described in detail below in conjunction with FIGS. 2, 5 and 6.

As shown in FIG. 2, an input to the super-resolution neural network comprises M components of the second noise image and the first color component, the second color component and the third color component of the first output image. An output from the super-resolution neural network is a second output image which is obtained after high-resolution conversion processing, wherein the second output image comprises a first color component, a second color component, and a third color component. In the embodiments of the present disclosure, the first color component, the second color component, and the third color component are RGB components. The second noise image has a random noise such as a Gaussian noise, which is used to generate image detail information during high-resolution image conversion by the super-resolution neural network, so that the output second output image not only has a high resolution but also comprises the image detail information, that is, diversity of output image results is realized.

As shown in FIG. 5, the super-resolution neural network comprises an enhancement unit and a transform unit which are sequentially connected, wherein executing high-resolution conversion processing by using the super-resolution neural network comprises: executing up-scale processing on the first output image and the second noise image by using the enhancement unit and outputting a first intermediate image including three components, which are a luminance component, a first color difference component, and a second color difference component, i.e., YUV components in the embodiments of the present disclosure; and transforming the first intermediate image output by the enhancement unit into a second output image including three components, which are a first color component, a second color component, and a third color component i.e., RGB components in the embodiments of the present disclosure by using the transform unit. The first intermediate image has an enhanced image resolution as compared to the first output image, and a number of times by which the image resolution is enhanced may be determined by a specific structure of the enhancement unit. In the embodiments of the present disclosure, for example, the enhancement unit may enhance a number of pixels of the input image by 4 times, and is referred to as a 4*4 enhancement unit, that is, if a number of pixels of the first output image is m*n, a number of pixels of the first intermediate image output after the first output image is processed by the 4*4 enhancement unit is 4m*4n. The first intermediate image with an enhanced resolution and the image detail information is transformed into a second output image having three components, i.e., RGB components through the transform unit.

FIG. 6 illustrates a specific structural diagram of a super-resolution neural network including a 4*4 enhancement unit. The 4*4 enhancement unit comprises a first sub-network, a second sub-network, and a third sub-network, wherein an input to each of the sub-networks is the first output image and the second noise image, and all of the sub-networks have the same structure, i.e., including the same number of convolutional layers CO and the same number of enhancement layers MUX. It should be understood that specific parameters of various sub-networks are different. In the embodiments of the present disclosure, the super-resolution neural network may comprise a plurality of enhancement units, and the enhancement units each may comprise a plurality of sub-networks, which are three sub-networks in the embodiments of the present disclosure. It should be understood that the enhancement units each may comprise one or more sub-networks in other embodiments, and may also comprise standard technologies such as Bicubic to achieve amplification of the image resolution. Further, each of the sub-networks comprises at least one enhancement sub-unit, each of which comprises at least one convolutional layer and one MUX layer which are sequentially connected. Further, each of the sub-networks may further comprise at least one convolutional layer after the plurality of enhancement sub-units. For example, each enhancement sub-unit in each of the sub-networks specifically comprises two convolutional layers CO and a MUX layer (a specific structure of which is shown in FIG. 6) which are sequentially connected, wherein the convolutional layers CO each are configured to extract image features and the MUX layer is configured to execute up-scale processing on the mini-batches extracted by the convolutional layers. Specific functions of the convolutional layers and the MUX layer are the same as those in the generative neural network described above, and will not be described in detail here.

In the embodiments of the present disclosure, the first sub-network outputs luminance component information of the first intermediate image, that is, Y component information, the second sub-network outputs first color difference component information of the first intermediate image, that is, U component information, and the third sub-network outputs second color difference component information of the first intermediate image, that is, V component information. The first intermediate image including the YUV components is transformed into a second output image including RGB components through the transform unit.

In the embodiments of the present disclosure, a resolution of the first low resolution output image output by the generative neural network is enhanced by the super-resolution neural network, and the second high resolution output image is finally output, so that the image conversion result can more satisfy the requirements of the product for the image resolution, and a better user experience is obtained.

Figure 7:
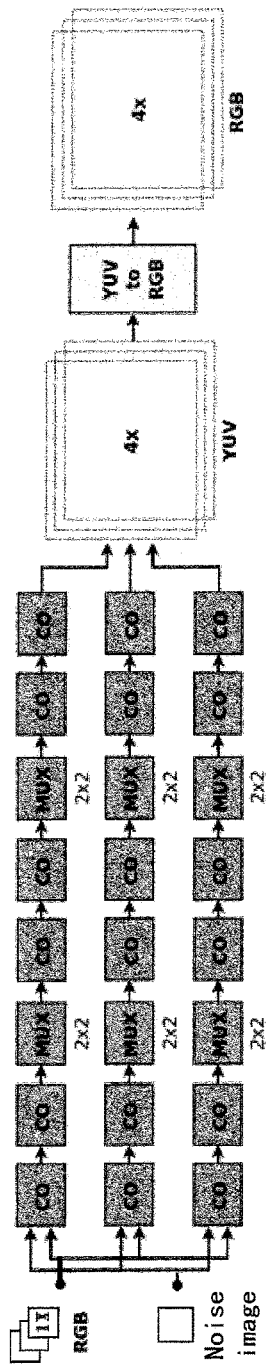
FIG. 7 illustrates a flowchart of training a generative neural network.
Figure 8:
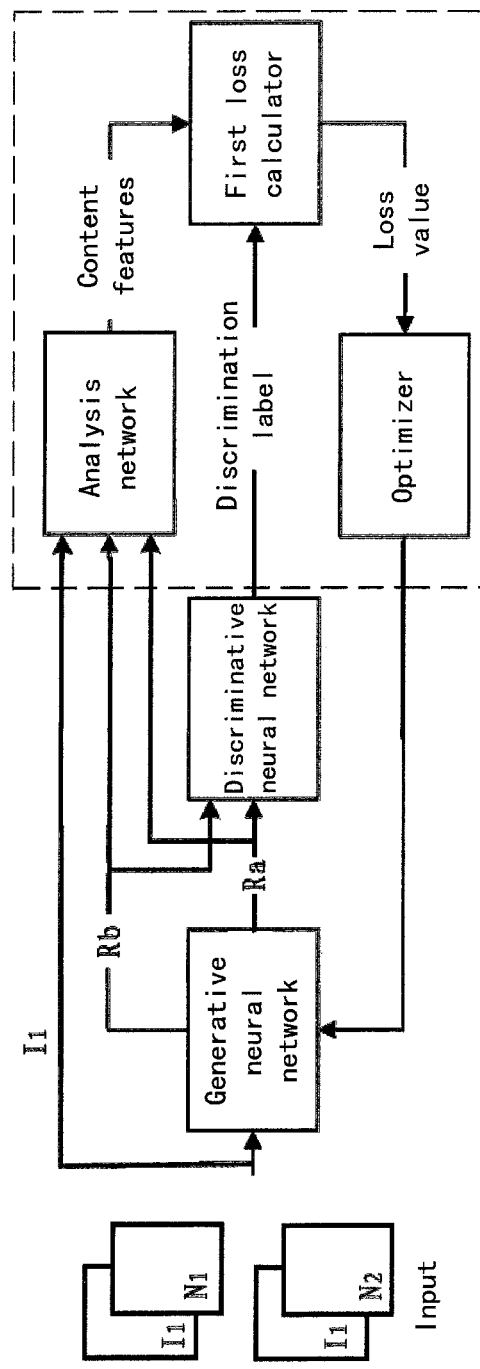
FIG. 8 illustrates a block diagram of training a generative neural network.

FIG. 7 illustrates a flowchart of training the generative neural network, and FIG. 8 illustrates a block diagram of training the generative neural network. A process of training the generative neural network will be described in detail below with reference to FIG. 7 and FIG. 8.

In the image processing method according to the embodiments of the present disclosure, as shown in FIG. 7, the input image is a first training image I1 and the first noise image is a first training noise image N1. In step S710, the first training image I1 including three components is acquired, and in step S720, the first training noise image N1 and a second training noise image N2 are acquired, wherein the noise images N1 and N2 have different random noises, and may be, for example, random noises.

In step S730, the generative neural network generates a first training output image Ra according to the first training image I1 and the first training noise image N1, and generates a second training output image Rb according to the first training image I1 and the second training noise image N2. A flow of converting the input image according to the input image and the noise image by using the generative neural network to output the converted image is the same as that shown in FIG. 1 and will not be described in detail here.

Then, in step S740, the generative neural network is trained based on the first training image I1, the first training output image Ra, and the second training output image Rb. The training is intended to optimize parameters in the generative neural network according to a processing result of the generative neural network, so that it can accomplish the conversion purposes.

As shown in FIG. 8, a specific process of training the generative neural network in step S740 comprises: inputting the first training output image Ra into a discriminative neural network to output a discrimination label indicating whether the first training output image Ra has converted features. For example, a loss value of the generative neural network is calculated by using a first loss calculation unit according to the first training image I1, the first training output image Ra, the second training output image Rb, and the discrimination label and the parameters of the generative neural network are optimized. In the embodiments of the present disclosure, the first training output image Ra may be input into the discriminative neural network together with the second training output image Rb, and discrimination labels may be output respectively for training the generative neural network.

Figure 9:
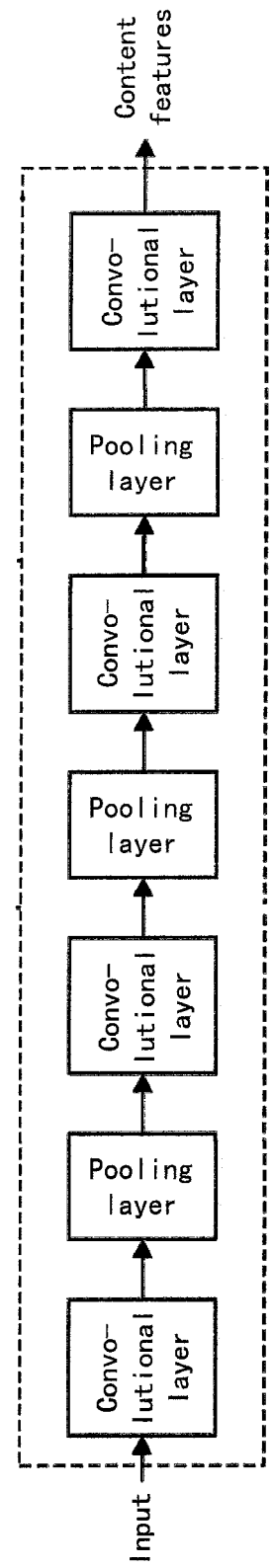
FIG. 9 illustrates a specific structural diagram of an analysis network.

As shown in FIG. 8, the first loss calculation unit may comprise three parts, which are an analysis network, a first loss calculator, and an optimizer. A specific structure of the analysis network is shown in FIG. 9, which consists of a number of convolutional networks and pooling layers for extracting content features of an input image. An output from each of the convolutional layers is features extracted from the input image. The pooling layers each are configured to reduce a resolution of mini-batches and pass it on to a next convolutional layer. Mini-batches from each convolutional layer characterize features of the input image at different levels (such as a texture, an edge, an object, etc.) In the embodiments of the present disclosure, the first training image I1, the first training output image Ra and the second training output image Rb are processed by using the analysis network, to extract the content features thereof, and the extracted content features are input into the first loss calculator.

The first loss calculator calculates, in accordance with the first loss calculation function, the loss value of the generative neural network according to the content features of the first training image I1, the first training output image Ra and the second training output image Rb and the discrimination label. The first loss calculator inputs a calculated total loss value of the generative neural network into an optimizer, which optimizes convolution kernels and biases in the convolutional layers of the generative neural network according to the loss value to achieve a processing effect which is closer to the image conversion purposes.

In the embodiments of the present disclosure, the first loss calculation function comprises a style difference loss function for calculating a style loss value of the generative neural network according to style features of the first training output image Ra and style features of the second training output image Rb. In the analysis network (as shown in FIG. 9), an output from each convolutional layer is features of the input image. It is assumed that a certain convolutional layer has $N_l$ convolution kernels, and an output from the convolutional layer comprises $N_l$ mini-batches, and it is assumed that a size of each mini-batch is $M_l$ (which is a width x a height of the mini-batch). Outputs from such l layers may be stored in a matrix $F^l \in R^{N_l \times M_l}$. $F_{ih}^l$ represents a value at a $j^{th}$ position in a mini-batch output by an $i^{th}$ convolution kernel in a $l^{th}$ layer.

In the embodiments of the present disclosure, a difference between output images is characterized according to a style loss value between the training output images Ra and Rb. Assuming that ă and x̌ are two images input to the analysis network respectively, and Gram matrixes output at the $l^{th}$ layer are $A^l$ and $G^l$ respectively, a style loss function of ă and x̌ at this layer is:

$$E_l = \frac{1}{4N_l^2 M_l^2 C2} \sum_{i,j} (G_{ij}^l - A_{ij}^l)^2$$

where $E_l$ represents the style loss function, and C2 is a constant, which is used to normalize the result. $N_l$ represents that there are $N_l$ convolution kernels in the $l^{th}$ layer of the analysis network, and then an output from the convolutional layer contains $N_l$ mini-batches. A size of each mini-batch is $M_l$ (which is a width×a height of the mini-batch). The Gram matrixes $A^l$ and $G^l$ are defined as:

$$G_{ij}^l = \sum_k F_{kj}^l F_{ik}^l$$

where $G_{ij}^l$ represents a value at a $j^{th}$ position in a Gram matrix (which is style features of x̌) corresponding to an $i^{th}$ convolution kernel in the $j^{th}$ convolutional layer, and then $A_{ij}^l$ represents a value at a $j^{th}$ position in a Gram matrix (which is style features of ă) corresponding to the $i^{th}$ convolution kernel in the $j^{th}$ convolutional layer.

Therefore, if the analysis network extracts the style features of the input image through L convolutional layers, a total style loss function is expressed as:

$$L_{style} = \sum_{l=0}^{L} w_l E_l$$

where $w_l$ is a weight of a style loss of the $j^{th}$ layer relative to the total style loss.

In the embodiments of the present disclosure, the style features may be extracted through a plurality of convolutional layers in the analysis network, or may also be extracted through one convolutional layer in the analysis network, which is not specifically limited herein.

Therefore, a difference between styles of the two training output results Ra and Rb is:

$$L_{RaRb} = \frac{1}{2C3} \sum_{l=0}^{L} w_l \frac{1}{4N_l^2 M_l^2} \sum_{i,j} (G_{ij}^l - A_{ij}^l)^2$$

where C3 is a constant which is used to normalize the result.

In order to make the diversity of the output results more obvious, which requires that the style loss between two output results should be as large as possible, the style loss is expressed as:

$$L_{DVST} = \frac{1}{L_{RaRb}}$$

The first loss calculator calculates, in accordance with the above total style loss function $L_{style}$, the style loss value between the output images according to the style features of the first training output image Ra and the second training output image Rb output by the analysis network to ensure diversity of the output image results.

In the embodiments of the present disclosure, the first loss calculation function further comprises a content loss function. I1 is the input image, Ra is the first training output image, and $P^l$ and $F^l$ are corresponding mini-batches output by the $l^{th}$ layer in the analysis network, respectively. In this case, the content loss function is defined as follows:

$$L_{content} = \frac{1}{2C1} \sum_{ij} (F_{ij}^l - P_{ij}^l)^2$$

where C1 is a constant which is used to normalize the result, $F_{ij}^l$ represents a value at a $j^{th}$ position in $F^l$ output by an $i^{th}$ convolution kernel in a $l^{th}$ convolutional layer in the analysis network, and $P_{ij}^l$ represents a value at a $j^{th}$ position in $P^l$ output by the $i^{th}$ convolution kernel in the $l^{th}$ convolutional layer.

Content loss values $L_{content\_a}$ and $L_{content\_b}$ of the first training output image Ra and the second training output image Rb which are obtained after processing by the generative neural network with respect to the first training image may be calculated in accordance with the content loss function according to the mini-batches output by the first training image I1, the first training output image Ra and the second training output image Rb in the analysis network.

The content loss values of the generative neural network are calculated, which can ensure consistency between the converted image output by the generative neural network and the input image, so that the processed output image has converted features while retaining sufficient original information. In the embodiments of the present disclosure, the generative neural network is trained by using the generative neural network in combination with the content loss function, to ensure consistency between the converted image and the input image, and ensure that the system is simple and is easy to train.

In the embodiments of the present disclosure, the first loss calculation function further comprises a loss function of a generator:

$$L\_G = E_{x \sim Pdata(x)}[\log D(x)] + E_{z \sim Pz(z)}[1 - \log D(G(z))]$$

where Pdata is a set of images which make the output from the discriminative neural network be 1, Pz is a set of input images of the generative neural network, D is the discriminative neural network, and G is the generative neural network. The first loss calculator calculates an adversarial loss value of the generative neural network according to L_G.

In the embodiments of the present disclosure, the first loss calculation function may further comprise a parameter regularization loss function $L_{L1}$. In the neural network, convolution kernels and biases are parameters which are obtained after being trained. The convolution kernels decide what to do with an input image, and the biases determine whether an output from the convolution kernels is input to a next layer. Therefore, in the neural network, the biases may be vividly described as "switches", which decide whether the convolution kernels are "on" or "off." For different input images, the network turns on or off different convolution kernels to achieve different processing effects.

A mean of absolute values of all the convolution kernels in the neural network is:

$$W = \frac{\sum \|w\|}{C_w}$$

where $C_w$ is a number of the convolution kernels in the network. A mean of absolute values of all the biases in the neural network is:

$$B = \frac{\sum \|b\|}{C_b}$$

where $C_b$ is a number of the biases in the network. Then the parameter regularization loss function is:

$$L_{L1} = \frac{W}{B + \varepsilon}$$

where $\varepsilon$ is a very small positive number, to ensure that the denominator is not 0.

It is desirable in the embodiments of the present disclosure that a bias in the convolutional layer has a greater absolute value than that of the convolution kernel so as to more effectively exert the effect of a biased "switch." During training, the first loss calculator calculates a parameter regularization loss value of the generative neural network according to $L_{L1}$.

In summary, a total loss of the generative neural network is:

$$L_{total} = \alpha L_{content} + \beta L\_G + \chi L_{DVST} + \delta R$$

where R is a normalized loss value of the generative neural network, $\alpha$, $\beta$, $\chi$ and $\delta$ are weights of the content loss value, the adversarial loss value, the style loss value and the normalized loss value relative to the total loss respectively. In the embodiments of the present disclosure, the parameter regularization loss value described above may be used to represent the normalized loss value, but other types of regularization losses may also be used.

Figure 10:
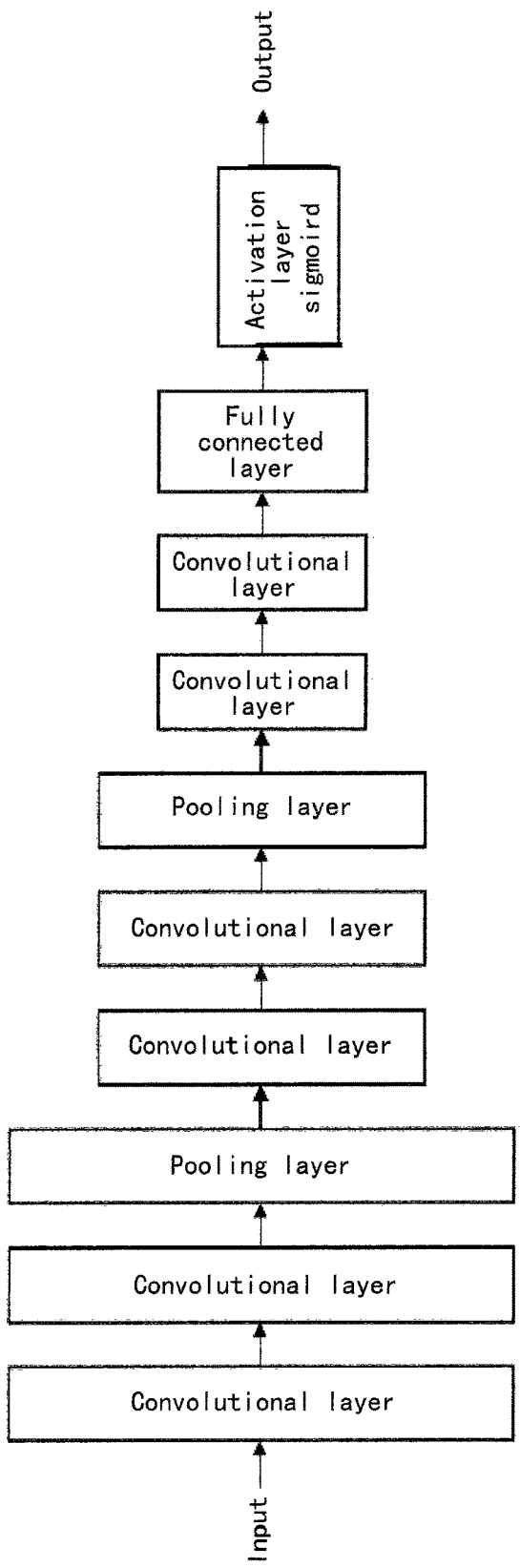
FIG. 10 illustrates a specific structural diagram of a discriminative neural network.

The discriminative neural network used in training the generative neural network constitutes a group of adversarial networks together with the generative neural network. The discriminative neural network extracts the content features of the input image by using a plurality of convolutional layers and pooling layers and reduces a size of mini-batches for further extraction of image features by a next convolutional layer. The image features are further processed by using a fully connected layer and an activation layer to finally output a scalar value of a discrimination label indicating whether the input image has converted features. The fully connected layer has the same structure as that of the convolutional neural network except that the convolution kernels are replaced by the scalar value. The activation layer is typically a RELU or sigmoid function. In the embodiments of the present disclosure, a specific structure of the discriminative neural network is shown in FIG. 10, in which the activation layer is a sigmoid function, and finally the discrimination label is output.

In the adversarial networks, the generative neural network converts the input image with an effect A into an output image with an effect B, and the discriminative neural network judges whether the output image has a feature of the effect B, and outputs a discrimination label. For example, if it is judged that the output image has the feature of the effect B, the output is close to "1", and if it is judged that the output image does not have the feature of the effect B, "0" is output. The generative neural network is gradually generated through training, so that the discriminative neural network outputs an output image which is "1", and the discriminative neural network can gradually more accurately judge whether the output image has converted features. Both of the generative neural network and the discriminative neural network are trained synchronously and are adverse to each other to obtain better parameters.

Training the discriminative neural network comprises: outputting a first output image as a first sample image Ra according to the input image and the first noise image by using the generative neural network, wherein the first sample image Ra is an output image which is obtained by converting an effect A into an effect B using the generative neural network, and is equivalent to a "fake" sample; acquiring a sample image Rc from a data set, wherein the sample image Rc acquired from the data set is a "true" sample with the effect B; and judging whether the Ra and the Rc have the effect B by using the discriminative neural network, to output a discrimination label. It is to be understood that the second sample image Rc is naturally with a "true" label, i.e., having converted features, and the first sample image Ra is naturally with a "fake" label, which obtains the converted features by being subjected to image processing by the generative neural network. The discriminative neural network is trained according to the discrimination label, so that it can gradually more accurately judge whether the input image has corresponding image features.

Figure 11:
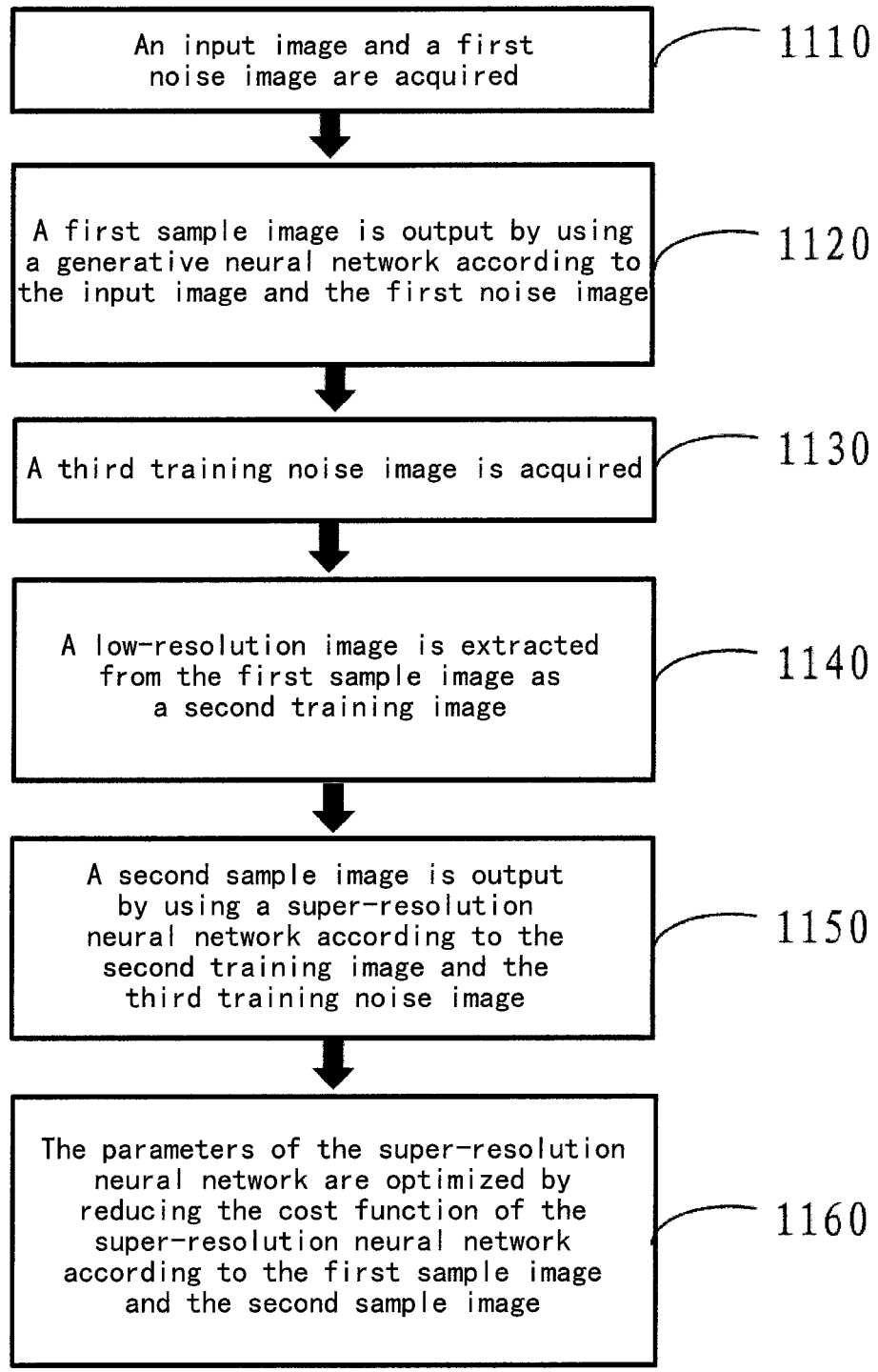
FIG. 11 illustrates a flowchart of training a super-resolution neural network.

In the image processing method according to the embodiments of the present disclosure, a flowchart of training the super-resolution neural network is shown in FIG. 11. The training of the super-resolution neural network will be described in detail below with reference to FIG. 11.

As shown in FIG. 11, in step S1110, an input image and a first noise image are acquired, wherein the input image has three components, i.e., RGB components in the embodiments of the present disclosure, and the first noise image has a random noise such as a Gaussian noise, which is used to generate image detail information during image conversion. In step S1120, the input image is subjected to image conversion processing by the generative neural network according to the acquired input image and first noise image, to output a first output image which is used as a first sample image R1 for training the super-resolution neural network.

In step S1130, a super-resolution training noise image N3 is acquired, and in step S1140, a low-resolution image is extracted from the first sample image R1 as a super-resolution training image I2. A resolution of the super-resolution training image I2 is lower than that of the first sample image R1 and contains content features of the first sample image R1. It should be understood that the first sample image R1 may be recovered from the super-resolution training image I2.

Then, in step S1150, a second sample image R2 is output according to the super-resolution training image I2 and the super-resolution training noise image N3 using the super-resolution neural network. A resolution of the second sample image R2 is higher than that of the super-resolution training image I2 and may be equal to that of the first sample image R1. In this step, the super-resolution training noise image N3 is input into the super-resolution neural network for training together with the super-resolution training image I2 to generate detail information in the output image, and as noise images which are input multiple times are different from each other, a change in image detail may be generated during each image processing, so that diversity of the output super-resolution images is realized.

In step S1160, the parameters of the super-resolution neural network are optimized by reducing the cost function of the super-resolution neural network according to the first sample image R1 and the second sample image R2.

In the embodiments of the present disclosure, the cost function of the super-resolution neural network may be based on a discrimination label of a second discriminative neural network. A process of generating the discrimination label comprises inputting the first sample image R1 and the second sample image R2 into the second discriminative neural network for evaluating an image quality of the second sample image R2 of which the resolution is enhanced and outputting a discrimination label indicating whether the sample image is an output image (which is the second sample image R2) of the super-resolution neural network or an original image (which is the first sample image R1) from which a low-resolution image is extracted. In the embodiments of the present disclosure, the second discriminative neural network may receive an input image (which is the second sample image R2 in the embodiments of the present disclosure) having three components i.e., RGB components, and output a digit, for example, −1 or 1. If the output is 1, the second discriminative neural network considers that the input image corresponds to the original high-resolution content (which is the first sample image R1 in the embodiments of the present disclosure). If the output is −1, the second discriminative neural network considers that the second sample image R2 is an output image of which a resolution is enhanced by the generative neural network. The super-resolution neural network is trained to maximize the discrimination label of the second discriminative neural network, to gradually enable the discrimination label to be as real as possible. At the same time, the second discriminative neural network is trained to accurately distinguish the original high-resolution image from the image of which the resolution is enhanced. The super-resolution neural network constitutes a group of adversarial networks together with the second discriminative neural network. The two groups of networks are alternately trained to be adverse to each other and obtain the best parameters.

Figure 12:
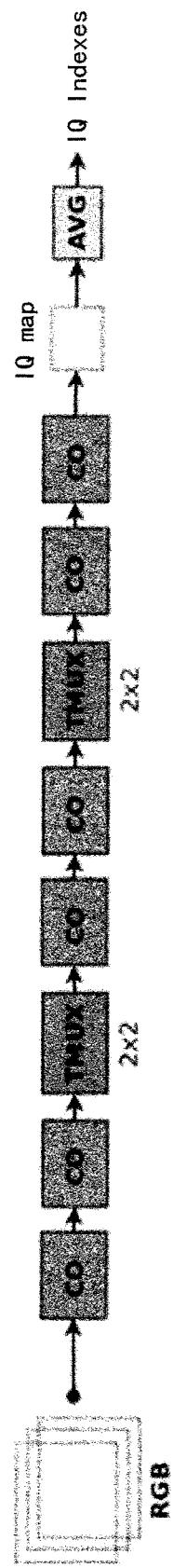
FIG. 12 illustrates a specific structural diagram of a second discriminative neural network.

As shown in FIG. 12, a specific structure of the second discriminative neural network comprises at least degradation sub-units, and each of the degradation sub-units comprises at least one convolutional layer and one degradation TMUX layer which are sequentially connected. Further, the second discriminative neural network may further comprise at least one convolutional layer after a plurality of enhancement sub-units. For example, each enhancement sub-unit specifically comprises two convolutional layers CO and a TMUX layer which are sequentially connected. The TMUX layer executes a degradation process corresponding to the MUX layer in the super-resolution neural network so that the output image which is generated according to the second sample image and is input into the second discriminative neural network is degraded to a low resolution image having the same resolution as that of the second sample image. A process of the TMUX layer degrading the input image is opposite to a enhancement process of the MUX layer. The second discriminative neural network outputs an "IQ map" of images which is similar to other image quality metrics (for example, a Structural Similarity Index (SSIM)) by using the convolutional layer. An average value is obtained by averaging all the pixels in the "IQ map" as the "discrimination label" having a single digit and the discrimination label is output.

The embodiments of the present disclosure provide an image processing method for implementing image conversion, which executes image conversion processing based on a generative neural network, a super-resolution neural network, and content perception. Detail information of a converted image is generated by adding a noise image into an input. The generative neural network is trained by using a content feature loss function, to ensure that the converted output image has the same content as that of the input image. The generative neural network is trained by using a style difference loss function between processed results, to ensure diversity of the output results, which makes the system simple and easy to train. Based thereon, the super-resolution neural network is used to enhance a resolution of the converted image output by the generative neural network, and parameters of the super-resolution neural network are optimized by reducing a cost function of the super-resolution neural network. Thereby, the converted high resolution image can be obtained by using the trained generative neural network and super-resolution neural network. The converted image not only comprises converted features but also satisfies the requirements of the product for image resolution.

Figure 13:
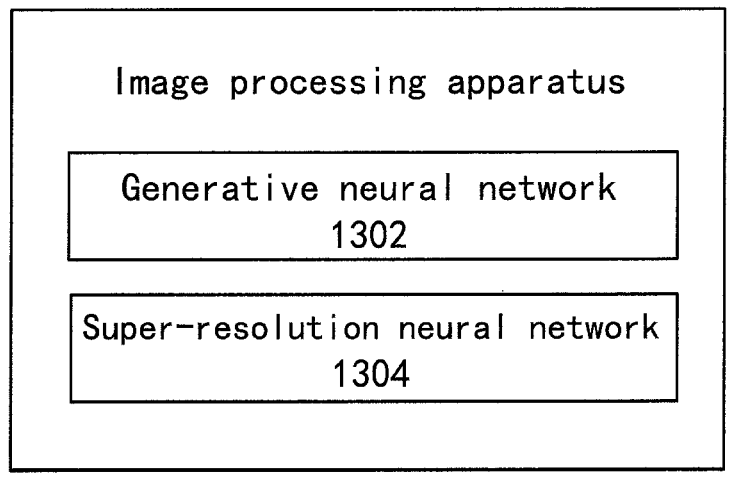
FIG. 13 illustrates a schematic block diagram of an image processing device according to an embodiment of the present disclosure.

The embodiments of the present disclosure further provide an image processing device, which, as shown in FIG. 13, comprises a generative neural network 1302 configured to execute image conversion processing on an input image according to the input image and a first noise image to acquire and output a first output image, wherein the first noise image comprises N components, where N is an integer greater than or equal to 1. The generative neural network may be the generative neural network described above. An image processing apparatus according to the embodiments of the present disclosure executes image conversion processing on the input image and the noise image by using a generative neural network to output the converted output image. The image processing apparatus further comprises a super-resolution neural network 1304, and executes high-resolution conversion processing on the first output image and a second noise image by using the super-resolution neural network to output a second output image, wherein the second noise image comprises M components, where M is a positive integer greater than or equal to 1, wherein the first noise image is different from the second noise image.

The input image comprises a first color component, a second color component and a third color component, which are RGB components in the embodiments of the present disclosure. An input to the generative neural network comprises the components of the first noise image and the RGB components of the input image. An output from the generative neural network is the first output image, including a first color component, a second color component, and a third color component, which are RGB components in the embodiments of the present disclosure.

The generative neural network is configured to comprise one or more down-scale units, one or more residual units and one or more up-scale units. The down-scale units each comprise a convolutional layer, a down-scale layer and an instance normalization layer which are sequentially connected; the residual units each comprise a convolutional layer and an instance normalization layer which are sequentially connected; and the up-scale units each comprise an up-scale layer, an instance normalization layer and a convolutional layer which are sequentially connected, wherein a number of the up-scale units is equal to a number of the down-scale units.

An input to the super-resolution neural network comprises the components of the second noise image and the RGB components of the first output image. An output from the super-resolution neural network is the second output image including a first color component, a second color component and a third color component, which are RGB components in the embodiments of the present disclosure.

The super-resolution neural network comprises a enhancement unit and a transform unit which are sequentially connected. The enhancement unit is configured to execute up-scale processing on the first output image and the second noise image and output a first intermediate image including a luminance component, a first color difference component, and a second color difference component, which are YUV components in the embodiments of the present disclosure. The transform unit is configured to transform the first intermediate image output by the enhancement unit into the second output image which comprises the RGB components. The enhancement unit comprises a first sub-network, a second sub-network and a third sub-network, wherein an input to each of the sub-networks is the first output image and the second noise image; and all of the sub-networks comprise the same structure, and comprise the same number of convolutional layers and enhancement layers.

In the embodiments of the present disclosure, the generative neural network executes image conversion by using a first training image I1 and a first training noise image N1 to output a converted first training output image Ra, and executes image conversion by using the first training image I1 and a second training noise image N2 to output a converted second training output image Rb.

A neural network training unit trains the generative neural network based on the first training image I1, the first training output image Ra, and the second training output image Rb. The training is intended to optimize the parameters in the network according to a processing result of the generative neural network, so that it can accomplish the conversion purposes.

The neural network training unit comprises a discriminative neural network configured to output a discrimination label indicating whether the first training output image Ra has converted features, and a first loss calculation unit configured to calculate a loss value of the generative neural network according to the first training image I1, the first training output image Ra, the second training output image Rb, and the discrimination label, to optimize the parameters of the generative neural network. For example, the parameters comprise convolution kernels and biases of convolutional layers in the generative neural network. In the embodiments of the present disclosure, the first training output image Ra may be input into the discriminative neural network together with the second training output image Rb, and the discriminative neural network outputs discrimination labels respectively for training the generative neural network.

The trained generative neural network has optimized parameters which can be used to implement the intended image conversion processing. In the present disclosure, the first loss calculation unit is configured to execute training in combination with content features of the input image, the first output image and the second output image, which makes the system simple and easy to train. A loss function which realizes diversity of results is used to ensure diversity of converted images output by the generative neural network. A content loss function is used to ensure that the converted output image is consistent with the input image. That is, the converted image not only has converted features but also comprises sufficient original image information to avoid a loss in a large amount of original image information during the image processing.

According to the embodiments of the present disclosure, the neural network training unit further comprises: a second discriminative neural network, configured to output a discrimination label indicating whether the second sample image R2 has content features corresponding to those of the first sample image according to the first sample image R1 and the second sample image R2. The neural network training unit further trains the super-resolution neural network according to the discrimination label output by the second discriminative neural network. For example, the optimizer optimizes the parameters of the super-resolution neural network by reducing the cost function of the super-resolution neural network.

In the embodiments of the present disclosure, the generative neural network generates the first output image according to the input image and the first noise image, wherein the first output image, as a first sample image, has converted features and comprises RGB components. The super-resolution neural network further outputs a second sample image according to the super-resolution training image and the acquired super-resolution training noise image, wherein the super-resolution training image is a low-resolution image extracted from the first sample image. The neural network training unit optimizes the parameters of the super-resolution neural network by reducing a cost function of the super-resolution neural network based on the first sample image and the second sample image, wherein the parameters may comprise convolution kernels and biases of convolutional layers in the super-resolution neural network.

The image processing apparatus for implementing image conversion according to the embodiments of the present disclosure executes image conversion processing based on the generative neural network, the super-resolution neural network, and content perception, and comprises a generative neural network and a super-resolution neural network. Detail information of a converted image is generated by adding a noise image into an input. The generative neural network is trained by using a content feature loss function, to ensure that the converted output image has the same content as that of the input image. The generative neural network is trained by using a style difference loss function between processed results, to ensure diversity of the output results, which makes the system simple and easy to train. Based thereon, the super-resolution neural network is used to enhance a resolution of the converted image output by the generative neural network, and the parameters of the super-resolution neural network are optimized by reducing the cost function of the super-resolution neural network. Thereby, the converted high resolution image can be obtained by using the trained neural network and super-resolution neural network. The converted image not only comprises converted features but also satisfies the requirements of the product for image resolution.

Figure 14:
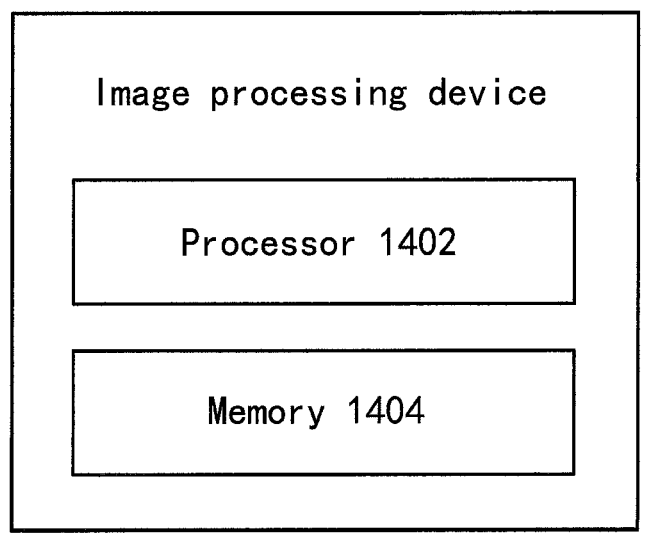
FIG. 14 illustrates a schematic block diagram of an image processing device according to an embodiment of the present disclosure.

The embodiments of the present disclosure further provide an image processing device. A block diagram of the image processing device is shown in FIG. 14, and comprises a processor 1402 and a memory 1404. It should be illustrated that a structure of the image processing device shown in FIG. 14 is only exemplary instead of limiting, and the image processing device may further have other components according to practical application requirements.

In the embodiments of the present disclosure, the processor 1402 and the memory 1404 may communicate with each other directly or indirectly. Components such as the processor 1402 and the memory 1404 etc. may communicate through a network connection. The network may comprise a wireless network, a wired network, and/or any combination of the wireless network and the wired network. The network may comprise a local area network, the Internet, a telecommunication network, an Internet of Things based on the Internet and/or the telecommunication network, and/or any combination of the above networks etc. For example, the wired network may communicate through a transmission manner such as a twisted pair, a coaxial cable or an optical fiber etc. The wireless network may use a communication manner such as a 3G/4G/5G mobile communication network, Bluetooth, Zigbee or WiFi etc. Types and functions of the network are not limited here in the present disclosure.

The processor 1402 may control other components in the image processing device to execute desired functions. The processor 1402 may be a device having a data processing capability and/or a program execution capability, such as a Central Processing Unit (CPU), a Tensor Processing Unit (TPU) or a Graphics Processing Unit (GPU) etc. The CPU may have X86 or ARM architecture etc. The GPU may be integrated directly onto a motherboard alone or built into a north bridge chip of the motherboard. The GPU may also be built into the CPU as the GPU has a powerful image processing capability.

The memory 1404 may comprise any combination of one or more computer program products, which may comprise various forms of computer-readable storage media, such as a volatile memory and/or a non-volatile memory. The volatile memory may comprise, for example, a Random Access Memory (RAM) and/or a cache etc. The non-volatile memory may comprise, for example, a Read Only Memory (ROM), a hard disk, an Erasable Programmable Read Only Memory (EPROM), a portable Compact Disk Read Only Memory (CD-ROM), a USB memory, a flash memory etc.

One or more computer readable codes or instructions may be stored on the memory 1404, and the processor 1402 may execute the computer instructions to execute the above image processing method or implement the above image processing apparatus. With respect to a detailed description of the image processing method and the image processing apparatus, reference may be made to a description in this specification related to the image processing method and the image processing apparatus, and details thereof are not described in detail here again. Various application programs and various data, such as image data sets, and various data (such as training data) used and/or generated by the application programs etc. may also be stored in the computer-readable storage medium.

The above description is only specific embodiments of the present disclosure, and the protection scope of the present disclosure is not limited thereto. The protection scope of the present disclosure should be based on the protection scope of the claims.

We claim:

1. An image processing method, comprising:
   acquiring an input image;
   acquiring a first noise image and a second noise image;
   executing image conversion processing on the input image with the first noise image using a generative neural network, to output the input image converted as a first output image; and
   executing high resolution conversion processing on the first output image with the second noise image using a super-resolution neural network, to output the first output image converted as a second output image,
   wherein the first noise image is different from the second noise image.

2. The image processing method according to claim 1, wherein
   the input image comprises a first color component, a second color component and a third color component;
   the first noise image comprises N components, where N is an integer greater than or equal to 1;
   an input to the generative neural network comprises the N components of the first noise image and the first color component, the second color component and the third color component of the input image; and
   an output from the generative neural network is the first output image which comprises a first color component, a second color component, and a third color component.

3. The image processing method according to claim 1, wherein the generative neural network is configured to comprise one or more down-scale units, one or more residual units and one or more up-scale units, wherein
   the down-scale units each comprise a convolutional layer, a down-scale layer and an instance normalization layer which are sequentially connected;
   the residual units each comprise a convolutional layer and an instance normalization layer which are sequentially connected; and
   the up-scale units each comprise an up-scale layer, an instance normalization layer and a convolutional layer which are sequentially connected, wherein a number of the up-scale units is equal to a number of the down-scale units.

4. The image processing method according to claim 1, wherein the second noise image comprises M components, where M is an integer greater than or equal to 1, and an input to the super-resolution neural network comprises the M components of the second noise image and a first color component, a second color component and a third color component of the first output image; and
   an output from the super-resolution neural network is the second output image which comprises the first color component, the second color component and the third color component.

5. The image processing method according to claim 1, wherein the super-resolution neural network is configured to comprise an enhancement unit and a transform unit which are sequentially connected, and executing high resolution conversion processing using the super-resolution neural network comprises:
   executing up-scale processing on the first output image with the second noise image using the enhancement unit and outputting a first intermediate image which comprises a luminance component, a first color difference component, and a second color difference component; and
   transforming the first intermediate image output from the enhancement unit into the second output image which comprises a first color component, a second color component and a third color component using the transform unit.

6. The image processing method according to claim 5, wherein the enhancement unit comprises a first sub-network, a second sub-network and a third sub-network, wherein an input to each of the sub-networks is the first output image and the second noise image; and all of the sub-networks have the same structure, and comprise the same number of convolutional layers and the same number of enhancement layers.

7. The image processing method according to claim 1, wherein the input image is a first training image, the first noise image is a first training noise image, and the first output image is a first training output image, and the image processing method further comprises:

acquiring a second training noise image; and generating a second training output image according to the first training image and the second training noise image using the generative neural network; and training the generative neural network based on the first training image, the first training output image and the second training output image.

8. The image processing method according to claim 7, wherein the training the generative neural network comprises:

inputting the first training output image to a discriminative neural network to acquire a discrimination label indicating whether the first training output image has converted features; and calculating a loss value of the generative neural network and optimizing parameters of the generative neural network according to the first training image, the first training output image, the second training output image and the discrimination label, wherein the calculating a loss value of the generative neural network comprises:

acquiring content features of the first training image, the first training output image and the second training output image, and acquiring style features of the first training output image and the second training output image;

calculating, in accordance with a first loss function, the loss value of the generative neural network according to the acquired content features and style features and the discrimination label of the first training output image; and optimizing the parameters of the generative neural network according to the loss value of the generative neural network.

9. The image processing method according to claim 8, wherein the first loss function comprises a style difference loss function, and the calculating the loss value of the generative neural network comprises: calculating, in accordance with the style difference loss function, a style loss value of the generative neural network according to the style features of the first training output image and the style features of the second training output image; and the first loss function further comprises a content loss function, and the calculating the loss value of the generative neural network comprises: calculating, in accordance with the content loss function, a content loss value of the generative neural network according to the content features of the first training image, the first training output image and the second training output image.

10. The image processing method according to claim 1, wherein the first output image is a first sample image, and the image processing method further comprises:

acquiring a super-resolution training noise image;

extracting a low-resolution image from the first sample image as a super-resolution training image, wherein a resolution of the super-resolution training image is lower than that of the first sample image;

acquiring a second sample image according to the super-resolution training image and the super-resolution training noise image using the super-resolution neural network, wherein a resolution of the second sample image is equal to that of the first sample image; and optimizing parameters of the super-resolution neural network by reducing a cost function of the super-resolution neural network according to the first sample image and the second sample image.

11. An image processing device, comprising:

one or more processor; and one or more memory, wherein the memory has computer readable instructions stored thereon, which when being executed by the one or more processor, for controlling the processor to be configured to:

configure a generative neural network to execute image conversion processing on an input image with a first noise image, to output the input image converted as a first output image; and configure a super-resolution neural network to execute high resolution conversion processing on the first output image with a second noise image, to output the first output image converted as a second output image, wherein the first noise image is different from the second noise image.

12. The image processing device according to claim 11, wherein the input image comprises a first color component, a second color component and a third color component, and the first noise image comprises N components, where N is an integer greater than or equal to 1;

an input to the generative neural network comprises the N components of the first noise image and the first color component, the second color component and the third color component of the input image; and the generative neural network is configured to output the first output image which comprises the first color component, the second color component, and the third color component.

13. The image processing device according to claim 11, wherein the generative neural network is configured to comprise one or more down-scale units, one or more residual units and one or more up-scale units, wherein the down-scale units each comprise a convolutional layer, a down-scale layer and an instance normalization layer which are sequentially connected;

the residual units each comprise a convolutional layer and an instance normalization layer which are sequentially connected; and the up-scale units each comprise an up-scale layer, an instance normalization layer and a convolutional layer which are sequentially connected, wherein a number of the up-scale units is equal to a number of the down-scale units.

14. The image processing device according to claim 11, wherein the second noise image comprises M components, where M is an integer greater than or equal to 1, and the super-resolution neural network is configured to have the M components of the second noise image and a first color component, a second color component and a third color component of the first output image as an input; and the super-resolution neural network is further configured to output the second output image which comprises the first color component, the second color component and the third color component.

15. The image processing device according to claim 11, wherein the super-resolution neural network is configured to comprise a enhancement unit and a transform unit which are sequentially connected, wherein the enhancement unit is configured to execute up-scale processing on the first output image and the second noise image and acquire a first intermediate image which comprises a luminance component, a first color difference component, and a second color difference component; and the transform unit is configured to transform the first intermediate image from the enhancement unit into the second output image which comprises a first color component, a second color component and a third color component, wherein the enhancement unit comprises a first sub-network, a second sub-network and a third sub-network.

16. The image processing device according to claim 15, wherein an input to each of the first sub-network, the second sub-network and the third sub-network is the first output image and the second noise image, and the output image has three components which comprise a luminance component, a first color difference component and a second color difference component; and all of the first sub-network, the second sub-network and the third sub-network have the same structure, and each comprise at least one enhancement sub-unit each of which comprises one or more convolutional layers and one enhancement layer which are sequentially connected.

17. The image processing device according to claim 11, wherein the processor is further configured to train the generative neural network based on a first training image, a first training output image and a second training output image by executing processes of:

outputting a discrimination label indicating whether the first training output image has converted features; and calculating a loss value of the generative neural network and optimizing parameters of the generative neural network according to the first training image, the first training output image, the second training output image and the discrimination label;

wherein the input image is the first training image, the first noise image is the first training noise image, and the first output image is the first training output image;

wherein the generative neural network further generates the second training output image according to the first training image and an acquired second training noise image, wherein the second training noise image is different from the first training noise image.

18. The image processing device according to claim 17, wherein the processor is further configured to calculate a loss value of the generative neural network and optimize parameters of the generative neural network by executing processes of:

acquiring content features of the first training image, the first training output image and the second training output image;

acquiring style features of the first training output image and the second training output image;

calculating, in accordance with a first loss function, the loss value of the generative neural network according to the acquired content features and style features and the discrimination label of the first training output image; and optimizing the parameters of the generative neural network according to the loss value of the generative neural network.

19. The image processing device according to claim 18, wherein the first loss function comprises a style difference loss function for calculating a style loss value of the generative neural network according to the style features of the first training output image and the style features of the second training output image; and the first loss function further comprises a content loss function for calculating a content loss value of the generative neural network according to the content features of the first training image, the first training output image and the second training output image.

20. The image processing device according to claim 17, wherein the processors are further configured to train the super-resolution neural network according to the output from the super-resolution neural network, wherein the first output image is a first sample image, and the super-resolution neural network is further configured to output a second sample image according to a super-resolution training image and an acquired super-resolution training noise image, wherein the super-resolution training image is a low-resolution image extracted from the first sample image, and wherein the processors are further configured to:

output a discrimination label based on the first sample image and the second sample image; and optimize parameters of the super-resolution neural network by reducing a cost function of the super-resolution neural network.

* * * * *